United States Patent
Wehling et al.

(10) Patent No.: US 10,222,473 B2
(45) Date of Patent: Mar. 5, 2019

(54) METHOD FOR PRODUCING AN ULTRASONIC SENSOR FOR A MOTOR VEHICLE

(71) Applicant: VALEO Schalter und Sensoren GmbH, Bietigheim-Bissingen (DE)

(72) Inventors: Hans-Wilhelm Wehling, Bietigheim-Bissingen (DE); Wolfgang Hamm, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 249 days.

(21) Appl. No.: 15/107,729

(22) PCT Filed: Dec. 4, 2014

(86) PCT No.: PCT/EP2014/076559
§ 371 (c)(1),
(2) Date: Jun. 23, 2016

(87) PCT Pub. No.: WO2015/096960
PCT Pub. Date: Jul. 2, 2015

(65) Prior Publication Data
US 2018/0172826 A1    Jun. 21, 2018
US 2018/0364353 A9    Dec. 20, 2018

(30) Foreign Application Priority Data
Dec. 23, 2013   (DE) .................... 10 2013 022 061

(51) Int. Cl.
*B60Q 1/00*      (2006.01)
*G01S 15/93*     (2006.01)
(Continued)

(52) U.S. Cl.
CPC ............ *G01S 15/931* (2013.01); *G01S 7/521* (2013.01); *G10K 9/22* (2013.01); *G01S 2015/938* (2013.01)

(58) Field of Classification Search
None
See application file for complete search history.

(56) References Cited

U.S. PATENT DOCUMENTS

2008/0184802 A1    8/2008    Sato

FOREIGN PATENT DOCUMENTS

CN    101473369 A    7/2009
CN    102265332 A    11/2011
(Continued)

OTHER PUBLICATIONS

Wehling et al.—Transducer apparatus for a vehicle, and apparatus comprising such ultrasonic sensor device, Jun. 20, 2011, (English Translation attached).*

(Continued)

*Primary Examiner* — Adolf Dsouza
(74) *Attorney, Agent, or Firm* — Osha Liang LLP

(57) ABSTRACT

A method for producing an ultrasound sensor for a vehicle is disclosed. A diaphragm for emitting ultrasound signals in an emitting direction and a sensor housing are provided for the sensor, where the diaphragm is fastened on the sensor housing, where the housing has a front side, which points in the emitting direction, and a rear side, which points opposite the emitting direction, and where, on the front side, the housing is formed with a front-side opening for the diaphragm, where the front side of the housing is connected to a cap which is composed of a foil and by way of which the front-side opening of the housing is covered in the emitting direction, where the diaphragm is inserted at least regionally into a receptacle of the cap and, a front side of the dia- (Continued)

Figure 1:
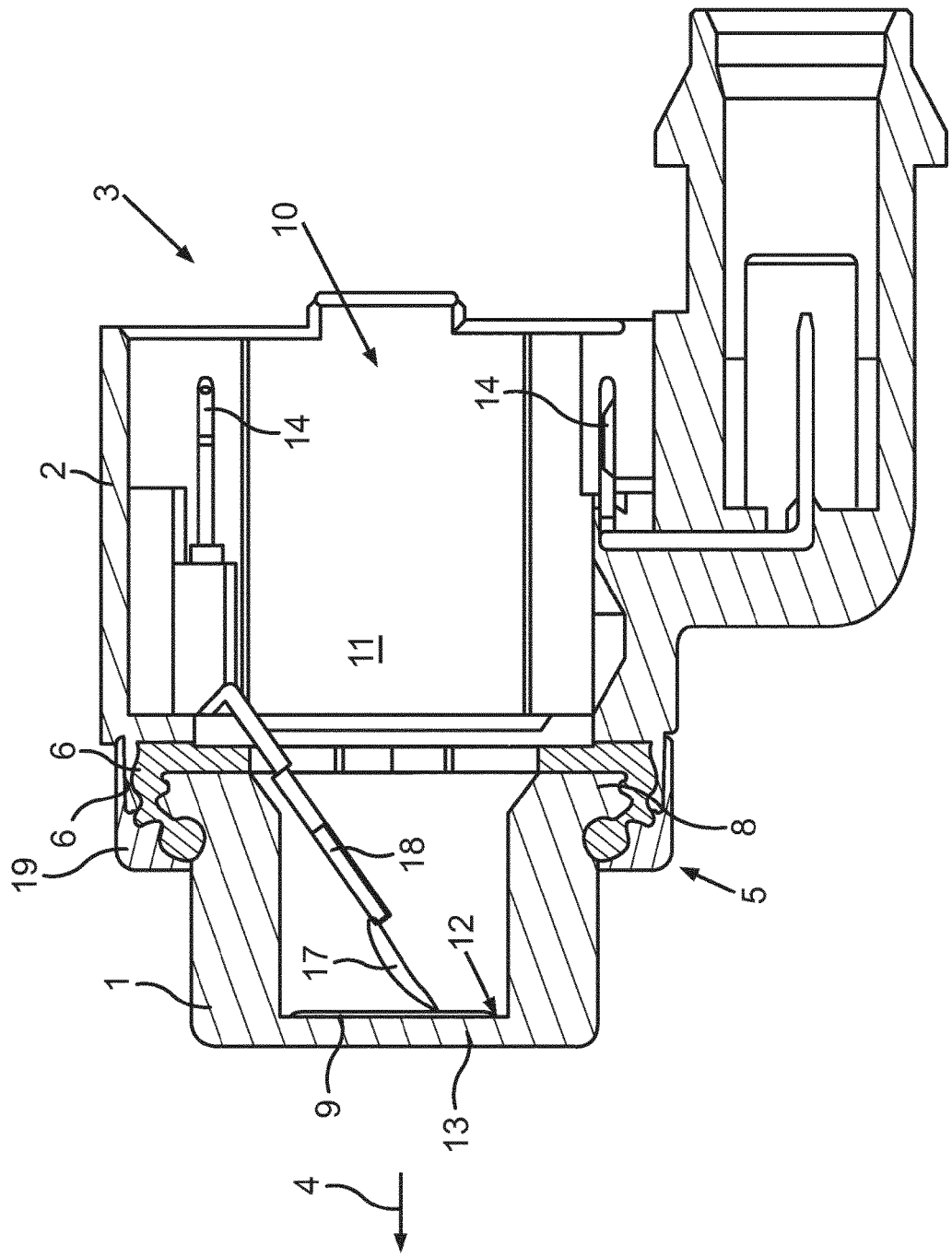

phragm, which points in the emitting direction, is connected to a base of the receptacle.

12 Claims, 2 Drawing Sheets

(51) Int. Cl.
*G10K 9/22* (2006.01)
*G01S 7/521* (2006.01)

(56) References Cited

FOREIGN PATENT DOCUMENTS

| | | |
|---|---|---|
| CN | 102331574 A | 1/2012 |
| DE | 100 07 050 A1 | 8/2001 |
| DE | 100 39 060 A1 | 3/2002 |
| DE | 101 25 272 A1 | 11/2002 |
| DE | 102 01 990 A1 | 7/2003 |
| DE | 10 2006 027 594 A1 | 12/2007 |
| DE | 10 2007 043 500 A1 | 3/2009 |
| DE | 10 2008 055 126 A1 | 7/2010 |
| DE | 10 2010 049 818 A1 | 5/2012 |
| DE | 10 2011 105 017 A1 | 12/2012 |
| DE | 10 2011 120 391 A1 | 6/2013 |
| EP | 2 027 580 B1 | 6/2009 |
| EP | 2 660 627 A1 | 11/2013 |
| JP | 2008-191007 A | 8/2008 |
| JP | 2010-245600 A | 10/2010 |
| WO | 2012/032584 A1 | 3/2012 |

OTHER PUBLICATIONS

Notice of Reason for Rejection issued in corresponding Japanese Patent Application No. 2016-542247, dated Aug. 25, 2017 (8 Pages).
International Search Report issued in PCT/EP2014/076559 dated May 27, 2015 (2 pages).
Written Opinion of the International Searching Authority issued in PCT/EP2014/076559 dated May 27, 2015 (5 pages).
German Search Report issued in Application 10 2013 022 061.0 dated May 27, 2015 (5 pages).
The First Office Action issued in corresponding Chinese Application No. 201480076202.2, dated May 2, 2017 (20 pages).

\* cited by examiner

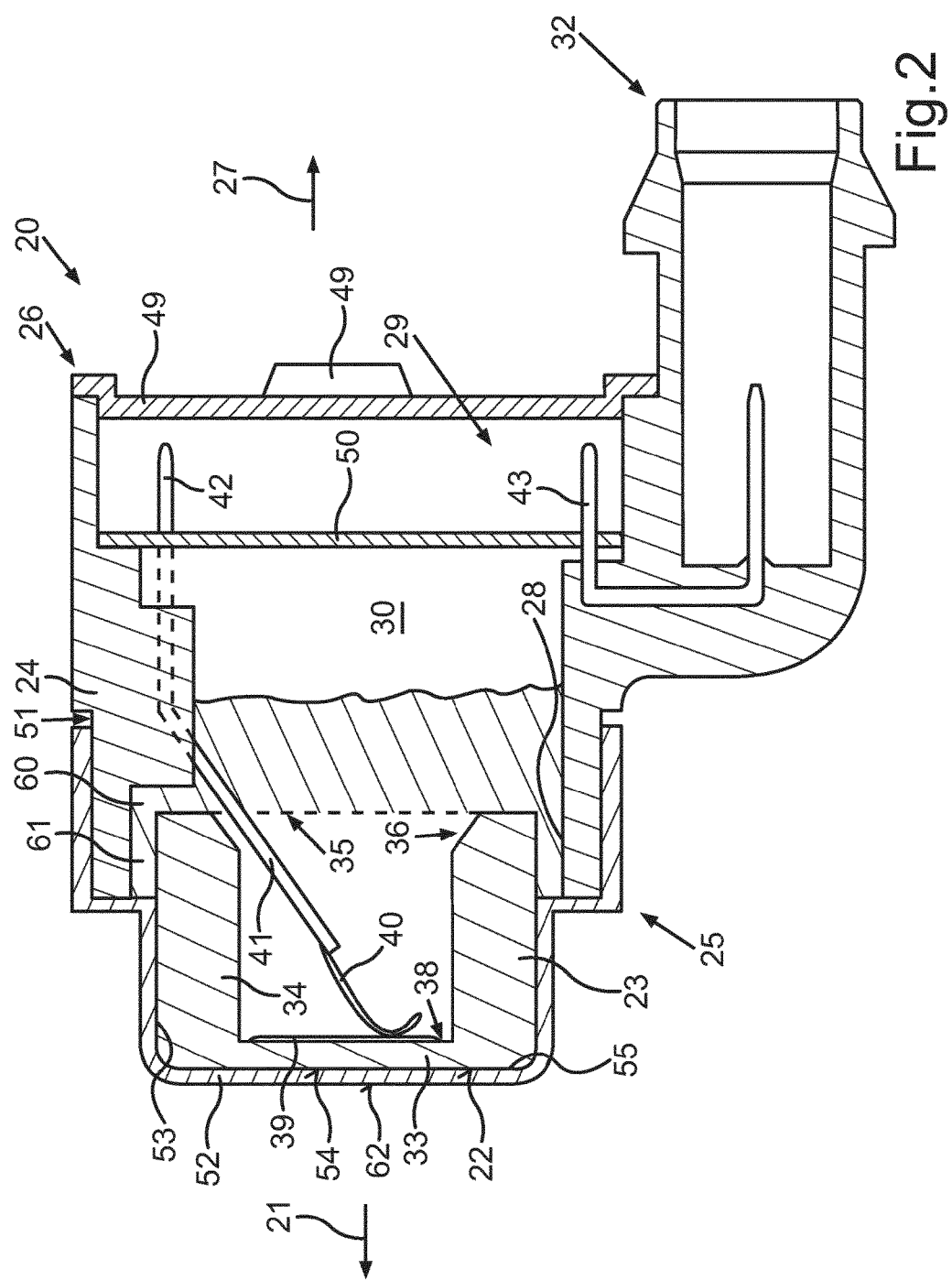

METHOD FOR PRODUCING AN ULTRASONIC SENSOR FOR A MOTOR VEHICLE

The invention relates to a method for producing an ultrasound sensor for a motor vehicle, in which method, for the ultrasound sensor, a diaphragm for emitting ultrasound signals in an emitting direction and a sensor housing are provided, in and/or on which sensor housing the diaphragm is fastened, wherein the sensor housing has a front side, which points in the emitting direction of the diaphragm, and a rear side, which points in a rearward direction which is opposite to the emitting direction, and wherein the sensor housing is, on the front side, formed with a front-side opening for the diaphragm. The invention also relates to an ultrasound sensor for a motor vehicle, and to a motor vehicle having an ultrasound sensor of said type.

Ultrasound sensors for motor vehicles are already prior art and may, in a manner known per se, be installed in the front region and in the rear region of a motor vehicle, for example on the bumpers. The ultrasound sensors are assigned to driver assistance devices and provide information regarding the surroundings of the vehicle, more precisely regarding the distances between the vehicle, on the one hand, and the obstructions situated in the surroundings thereof, on the other hand. Driver assistance devices may in this case be, for example, parking assistance systems, systems for blind spot monitoring, systems for maintaining inter-vehicle distance, braking assistance systems and the like.

It is already known for ultrasound sensors of said type to be arranged in unconcealed and thus visible fashion in associated paneling parts, for example in bumpers. This means that they are arranged in cutouts or passage openings extending all the way through the associated paneling part of the vehicle and are visible from the outside. Here, the pot-shaped diaphragm of the ultrasound sensor—the so-called aluminium pot—extends through the passage opening of the paneling part, such that a front side of the diaphragm terminates flush with the outer surface of the paneling part.

Transducers or ultrasound sensors installed in concealed fashion are also known. These are therefore not visible when the paneling part is viewed from the outside, and are concealed by the paneling part. In the case of ultrasound sensors installed directly behind the paneling part in this way, ultrasound signals are transmitted and received through the material of the paneling part—normally plastic.

The focus of interest in the present case is in particular on ultrasound sensors which are installed in visible and thus in non-concealed fashion, the diaphragms of which are arranged in a cutout extending all the way through the associated paneling part. An ultrasound sensor of said type is normally fastened to the paneling part by way of a bracket composed of plastic, wherein said bracket is attached to the paneling part by way of a double-sided adhesive tape, by hot caulking or else by way of ultrasound. The ultrasound sensor can then be inserted into and fastened to the bracket. The use of a bracket of said type for the visible installation of an ultrasound sensor on a bumper is known for example from document DE 10 2007 043 500 A1. Here, the sensor housing including the diaphragm is engaged with detent action into the bracket, which is connected directly to the bumper.

A method for producing an ultrasound sensor is known for example from EP 2 027 580 B1. A first assembly is formed by virtue of a piezo element being fastened to a diaphragm base of a pot-shaped diaphragm. Said first assembly is then inserted into a soft elastic decoupling element in order to form a second assembly. Said second assembly formed in this way is then inserted with detent action into a housing section of a sensor housing of the ultrasound sensor in order to form a third assembly. The decoupling element is inserted into the housing section in an installation direction, which is opposite to the transmitting direction of the ultrasound sensor.

A further method is described in DE 101 25 272 A1. In the case of said production method, the diaphragm of the ultrasound sensor is firstly placed into a two-component injection-moulding installation. In a further working step, a plastics housing is injection-moulded around the diaphragm. After the plastics housing has cured, a rubber-like decoupling element is injection-moulded between the diaphragm and the plastics housing in a further step. In this way, exact and permanent positioning of the diaphragm relative to the sensor housing is ensured.

A known method which serves for the production of an ultrasound sensor and which is similar to the method from document EP 2 027 580 B1 will be discussed in more detail below with reference to FIG. 1: firstly, a pot-shaped diaphragm 1 and a unipartite sensor housing 2 for an ultrasound sensor 3 are provided. The diaphragm 1 is firstly equipped, externally, with a surface protector. The sensor housing 2 is, from its front side 5 pointing in an emitting direction 4 of the diaphragm 1, designed such that it can receive the diaphragm 1 together with a decoupling element 6. For this purpose, the sensor housing 2 has a front-side opening 7 which forms a receptacle for the diaphragm 1 and the decoupling element 6. The diaphragm 1 has an encircling collar 8. At the pre-assembly stage, the diaphragm 1 is firstly pressed into the decoupling element 6. A unit formed by the diaphragm 1 and the decoupling element 6 is then installed in correctly positioned fashion into the sensor housing 2 or into the front-side opening 7 proceeding from the front side 5. Then, an additional decoupling ring 19 with a silicone surface moulded thereon is pushed onto the diaphragm 1 and mechanically fixedly connected to the sensor housing 2 by way of laser welding. On a second assembly line, it is then the case that a piezo element is inserted, in the emitting direction 4, into an interior space 11 of the sensor housing 2 through a rear-side installation opening 10 of the sensor housing 2, and is fastened by way of an adhesive to a rear side 12, facing toward the interior space 11, of a diaphragm base 13. A method of said type, and the selection of a suitable adhesive, is described in the document DE 10 2011 120 391 A1. In a further step, on the second assembly line, contact elements 18, which are intended to lead to the piezo element 9, are bent to, and a wire 17 is welded on, and the plug connectors are pressed into the sensor housing 2 in the emitting direction 4. Here, the wire is inserted into the sensor housing 2 through the rear-side installation opening 10 and is then welded onto the piezo element 9 by way of a laser and solder. Then, the interior space of the pot-shaped diaphragm 1 is filled, from the rear side and thus through the rear-side installation opening 10, with a sealing compound, and the ultrasound sensor is subjected to aging for approximately 24 hours. On a further assembly line, a printed circuit board is then pressed through the rear-side installation opening 10 onto plug connector pins 14. Insulation displacement technology is used for this purpose. The existing cavity or the interior space 11 of the sensor housing 2 is finally filled with an electronics sealing compound, and cured in a continuous furnace.

Most ultrasound sensors are nowadays produced in accordance with the principle described above. Although said production process has proven to be particularly reliable, a further challenge however consists in further simplifying the production process of the ultrasound sensors in order, in particular, to reduce production costs. In particular, here, firstly the fastening of the diaphragm to the decoupling element and the installation of said unit on the sensor housing, and secondly the attachment of the further decoupling ring and the welding process to the sensor housing, have proven to be relatively cumbersome. Since, nowadays, ultrasound sensors are used even for vehicles in low price segments, for example in small vehicles, there is a corresponding demand for adaptation of the production processes.

It is an object of the invention to specify a solution with which, in the case of a method of the generic type mentioned in the introduction, the outlay for the production of the ultrasound sensor can be reduced in relation to the prior art, without the characteristics of the ultrasound sensor itself being influenced, and/or to provide a more cost-effective sensor.

Said object is achieved according to the invention by way of a method, by way of an ultrasound sensor and by way of a motor vehicle having the features of the respective independent patent claims. Advantageous embodiments of the invention are specified in the dependent patent claims, in the description and in the figures.

A method according to the invention serves for the production of an ultrasound sensor for a motor vehicle. The ultrasound sensor is designed in particular for visible installation in a cutout extending all the way through a paneling part of the motor vehicle. For the ultrasound sensor, a diaphragm for emitting ultrasound signals in an emitting direction and a sensor housing are provided. The diaphragm is fastened in and/or on the sensor housing. By way of the sensor housing, the ultrasound sensor can then be installed, for example engaged with detent action, on a bracket which is connected to the paneling part of the motor vehicle. The sensor housing serves for accommodating components of the ultrasound sensor. The sensor housing has a front side, which points in the emitting direction of the diaphragm, and a rear side, which points in a rearward direction which is opposite to the emitting direction. The sensor housing is, on the front side, formed with a front-side opening for the diaphragm. It is provided according to the invention that the front side of the sensor housing is connected to a cap which is composed of a foil and by way of which the front-side opening of the sensor housing is covered in the emitting direction, wherein the diaphragm is inserted at least regionally into a receptacle of the cap and, here, a front side, which points in the emitting direction, of the diaphragm is connected to a base of the receptacle of the cap.

According to the invention, it is thus the case that a foil cap or a foil hat-like structure, and thus a cover, is provided, by way of which the front-side opening of the sensor housing is covered in the transmitting direction of the diaphragm and which has a receptacle which faces toward the interior space of the sensor housing and into which the front side of the diaphragm, through which the ultrasound signals are transmitted and which points in the emitting direction, is received or introduced. By virtue of the diaphragm being covered by way of the cap, it is achieved that no additional seal is required, and it may also be possible to dispense with the use of separate decoupling elements by way of which the diaphragm in the prior art is installed on the sensor housing. Specifically, the diaphragm is fastened by way of the inherently rigid cap composed of foil to the sensor housing and is thus reliably protected against external influences by the cap. The cap thus has the advantage that additional measures with regard to the sealing of the sensor housing at the interface between diaphragm and sensor housing, with the associated disadvantages with regard to installation outlay and costs, are rendered superfluous. Also, no problems arise with regard to ice formation during the operation of the ultrasound sensor. Furthermore, the diaphragm no longer needs to be coated with a surface protector, whereby the outlay in terms of production is further reduced. Thus, overall, the production outlay is reduced in relation to the prior art, because it is merely necessary for the diaphragm to be fastened in the receptacle of the cap, and for the cap to be fastened to the sensor housing.

The cap or the foil pot is preferably punched out of a flat foil strip on a production line and then deep-drawn in a tool under the action of heat. It is thus possible to purchase a single long foil strip without storage costs or packaging costs being incurred. It is advantageously possible for the foil strip to be provided, on one side, with a metal coating, in particular with a copper coating, which, after the deformation to form the cap, is situated on that side which faces toward the interior space of the sensor housing.

Here, it is also possible to dispense with the encircling collar of the diaphragm, such that the diaphragm is of pot-shaped form and has no collar. Specifically, a collar for the fastening of the diaphragm is no longer necessary.

With regard to the assembly sequence and the associated installation direction, it is now possible for two alternative embodiments to be provided:

On the one hand, the diaphragm may be inserted into the receptacle of the cap, and connected to the base of the receptacle, already before the connection of the cap to the sensor housing. It is then possible for the unit composed of cap and diaphragm to be connected to the front side of the sensor housing and thus fastened to the sensor housing, in particular fastened with greater dimensional accuracy or with narrower tolerances. In relation to the prior art, it is thus possible for the diaphragm to be installed on the sensor housing by way of the cap without great outlay, without the need here for elastic or soft elastic decoupling elements to be handled and welded to the housing. Furthermore, the ultrasound sensor external dimensions can be precisely set in this way.

On the other hand, provision may however also be made whereby, firstly, the cap is connected to the front side of the sensor housing, and subsequently, the diaphragm is inserted in the emitting direction into the sensor housing through a rear-side installation opening which is formed on the rear side of the sensor housing, and said diaphragm is placed, through an interior space and the front-side opening of the sensor housing, into an installed position at the front side of the sensor housing and thus into the receptacle of the cap, and said diaphragm is connected, in this installed position, to the base of the receptacle. In this embodiment, the diaphragm is thus installed not from the front side of the sensor housing but from the rear side, and thus in the emitting direction or in the transmitting direction of the diaphragm. The installation of the diaphragm and of the further components of the ultrasound sensor can thus be performed from only a single installation side, specifically from the rear side, through the rear-side installation opening. Thus, the production outlay is reduced, because no components have to be inserted into the interior of the sensor housing from the front side. This reduces not only the production outlay but also the production costs.

The diaphragm is preferably received in the receptacle of the cap with an accurate fit. This means in particular that the radius of the receptacle of the cap substantially corresponds to the outer radius of the diaphragm, and therefore at least a front-side section of the diaphragm is adapted in terms of its dimensions and its shape to the receptacle of the cap. Thus, a form-fitting connection is produced between the cap and the diaphragm. Thus, the base of the cap basically vibrates together with the front side of the diaphragm and therefore does not influence the vibration characteristics of the diaphragm, and also does not prevent the propagation of the ultrasound signals. Furthermore, the diaphragm can thereby be kept very stable during operation.

The cap is preferably produced from a foil with a thickness of less than 0.5 mm, in particular with a thickness of 0.2 or 0.25 or 0.3 mm. A particularly thin film of said type likewise permits unobstructed propagation of the ultrasound signals, and thus does not influence the operation of the diaphragm.

In one embodiment, the cap may, in particular on an inner side facing toward the sensor housing, be formed with a coating composed of metal, in particular of copper. A metallic coating of said type has the advantage that the cap is thus of electrically conductive form and forms a particularly good EMC (electromagnetic compatibility) shield.

In one embodiment, the cap may be covered with a coat of colour paint, in particular of the same colour as the vehicle and/or of a colour according to customer preference. In particular, the foil from which the cap is formed may already be a foil with a coat of colour paint. That is to say, the cap may have colour paint on the outer side, such that an ultrasound sensor of the desired colour is assembled already during the assembly process, and later painting can be dispensed with. It is thus possible to realize a high-quality overall appearance of the paneling part of the motor vehicle. It is thus possible to ensure a uniform, uninterrupted colour design by way of the coat of colour paint.

The front side of the diaphragm is preferably connected to the base of the receptacle of the cap by way of an adhesive pad. The front side of the diaphragm thus bears on the inner side of the base of the cap via the adhesive pad. Said adhesive pad may for example be a double-sided adhesive pad with a thickness of 0.05 mm. The use of the adhesive pad has the advantage in particular that no dosing of a liquid adhesive, and no curing under the action of heat, is necessary, whereby the required production time is reduced.

In one embodiment, the cap is mounted onto the front side of the sensor housing. The installation can thus be performed without great outlay.

Provision may also be made for the cap to be welded to the sensor housing, in particular by way of a laser welding apparatus. By way of the welding process, a very strong and/or sealed connection is realized which can withstand even relatively high forces during the operation of the motor vehicle. Furthermore, use may be made here of existing laser installations.

It may also be provided that an intermediate space between the diaphragm and the sensor housing and/or an interior space of the diaphragm is filled with a sealing compound, in particular with a single-component sealing compound. Use may for example be made of a silicone sealing compound, in particular a single-component silicone sealing compound, and/or an insulation foam, in particular a single-component foam, for example PU foam. It is then possible to dispense with an external decoupling ring between the ultrasound sensor and the paneling part of the vehicle. The advantage of a single-component silicone sealing compound consists in the easy application, and also in the fact that the sealing compound does not foam.

The invention also relates to an ultrasound sensor for a motor vehicle, having a diaphragm for emitting ultrasound signals in an emitting direction, and having a sensor housing, in and/or on which the diaphragm is fastened, wherein the sensor housing has a front side, which points in the emitting direction of the diaphragm, and a rear side, which points in a rearward direction which is opposite to the emitting direction, and wherein, on the front side, the sensor housing has a front-side opening for the diaphragm. The front side of the sensor housing is connected to a cap which is composed of a foil and by way of which the front-side opening of the sensor housing is covered in the emitting direction, wherein the diaphragm is inserted at least regionally into a receptacle of the cap and a front side, which points in the emitting direction, of the diaphragm is connected to a base of the receptacle of the cap.

A motor vehicle according to the invention comprises an ultrasound sensor according to the invention.

The preferred embodiments presented with regard to the method according to the invention, and the advantages thereof, apply correspondingly to the ultrasound sensor according to the invention, and to the motor vehicle according to the invention.

Further features of the invention will emerge from the claims, from the figures and from the description of the figures. All of the features and feature combinations mentioned above in the description, and the features and feature combinations mentioned below in the description of the figures and/or shown in the figures alone, may be used not only in the respectively specified combination but also in other combinations or individually.

The invention will now be discussed in more detail on the basis of some preferred exemplary embodiments and with reference to the appended drawings, in which:

FIG. 1 shows, in a schematic illustration, a sectional view through an ultrasound sensor according to the prior art; and FIG. 2 shows, in a schematic illustration, a sectional view through an ultrasound sensor according to a first embodiment of the invention.

FIG. 2 shows an ultrasound sensor 20 according to an embodiment of the invention. The ultrasound sensor 20 is provided for installation on a paneling part of a motor vehicle, for example on a bumper. Here, the ultrasound sensor 20 is provided in particular for the visible, and thus non-concealed, installation on the paneling part, such that, after installation on the paneling part, a front side 62, pointing in the emitting direction 21 of a diaphragm 23, of a cap 52 is visible from outside the motor vehicle, and for example terminates flush with the outer surface of the paneling part. It should however be understood that the ultrasound sensor may alternatively also be installed in concealed fashion. The ultrasound sensor is then not visible, and is concealed by the paneling part, when the paneling part is viewed from the outside. In that case, the ultrasound sensor would be installed directly behind the paneling part, and ultrasound signals would be emitted and received through the material of the paneling part—normally plastic.

The ultrasound sensor 20 comprises a sensor housing 24 in which the components of the ultrasound sensor 20 are accommodated in protected fashion. By way of the sensor housing 24, the ultrasound sensor 20 can be fastened to the paneling part. Here, the sensor housing 24 is for example connected to a bracket and fastened by way of the bracket to the paneling part. For example, the sensor housing 24 is engaged with detent action into the bracket. The sensor housing 24 is formed in one piece, for example from plastic.

The sensor housing 24 has a front side 25, which points in the emitting direction 21 or transmitting direction of the diaphragm 23, and a rear side 26, which points in an opposite direction 27. On the front side 25, there is formed in the sensor housing a front-side opening 28 which is a passage opening. Correspondingly, a rear-side installation opening 29 is also formed on the rear side 26. In the non-installed state, an interior space 30 of the sensor housing 24 is thus delimited only in a radial direction, and thus perpendicular to the emitting direction 21, by the plastics material.

The sensor housing 24 furthermore has a plug connector 32 by way of which the ultrasound sensor 20 can be electrically coupled to a control unit of the motor vehicle.

The diaphragm 23 is of altogether pot-shaped form and is composed for example of aluminium. The diaphragm 23 has a front side 22 which points in the emitting direction 21 and by way of which the ultrasound signals are emitted. The diaphragm 23 also has a diaphragm base 33, which has the front side 22, and a cylindrical encircling shell 34. At a rear side 35 situated opposite the front side 22, the diaphragm 23 is open and has an opening 36. The diaphragm 23 is formed without an encircling collar, and thus has no collar.

On a rear side 38, which faces toward the interior space 30, of the diaphragm base 33, there is arranged a piezo element 39 which is designed to excite the diaphragm 23. The piezo element 39 is supplied with electrical energy via a wire 40 and an electrical contact element 41 and a contact pin 42.

The sensor housing 24 is, on its front side 25, formed with an encircling seat 51 for the cap 52. The front-side opening 28 of the sensor housing 24 and the diaphragm 23 are concealed by way of the cap 52. The cap 52 is in this case formed from a foil, in particular a plastics foil. It is in the form of a foil cup or a foil hat-like structure and has a receptacle into which the diaphragm 23 is inserted with an accurate fit. The front side 22 of the diaphragm 23 is in this case adhesively bonded by way of an adhesive pad 54 to an inner side, which faces toward the interior space 30, and thus to a base 55, of the cap 52. Here, the shape of the receptacle 53 is adapted to the shape of the diaphragm 23, such that the internal diameter of the receptacle 53 substantially corresponds to the external diameter of the diaphragm 23.

The cap 52 is mounted axially onto the encircling seat 51 of the sensor housing 24 at the front side and is welded to the sensor housing 24 by way of a laser.

The cap 52 has a thickness of, for example, 0.2 or 0.25 mm.

Two alternative methods for the production and for the assembly of the ultrasound sensor 20 will be discussed in more detail below:

In both methods, the sensor housing 24, diaphragm 23 and the cap 52 are firstly provided separately from one another. Here, the cap 52 may be punched out of a thin foil strip on a production line and then deep-drawn in a tool at a high temperature. Said foil strip is provided, on one side, with a copper coating which, after the deformation to form the cap 52, is situated in the receptacle 53 and thus bears against the inner side and is placed in contact with the adhesive pad 54.

The diaphragm 23 is produced without a collar for prevention of relative rotation, and also does not need to be coated. Thus, an additional surface protector on the diaphragm 23 is dispensed with, because said diaphragm is protected by the cap 52.

In the first method, it is then the case that the diaphragm 23 is adhesively bonded in correctly positioned fashion into the receptacle 53 of the cap 52 by way of the adhesive pad 54, specifically without thermal curing. Then, the cap 52 can be pushed together with the diaphragm 23 onto the encircling seat 51 of the sensor housing 24 and connected thereto by way of a laser welding apparatus.

In the second method, it is firstly the case that the cap 52 is connected to the sensor housing 24 or alternatively to a separate holding element inserted into the sensor housing 24. Then, the diaphragm 23 is inserted into the interior space 30 through the rear-side installation opening 29, and is thereby placed into the installed position at the front side 25 and received in the receptacle 53 of the cap 52. To permit this, the contact pin 42 is relocated radially further outward, such that the interior space 30 is, in a radial direction, at least as large as the outer diameter of the diaphragm 23, and said diaphragm can be inserted into the interior space 30, and placed into the installed position, without obstruction.

In both methods, it is then the case, in a further step, that the piezo element 39 is installed. Here, the piezo element 39 is inserted into the interior space 30 from the rear side 26 through the rear-side installation opening 29, and is positioned on, pressed against and adhesively bonded to the rear side 38 of the diaphragm base 33. Here, use may for example be made of a liquid adhesive, optionally also an adhesive which cures at cold temperatures and which preferably cures in the absence of air, as described in DE 10 2011 120 391 A1. Alternatively, use may also be made of an adhesive pad.

It is then possible for the contact element 41 to be bent from the sensor housing 24, and the wire 40 is welded on and connected to the piezo element 39.

In both methods, it is then the case, in a further method step, that an intermediate space 61 between the diaphragm 23 and the sensor housing 24, and optionally also the interior space of the diaphragm 23, and optionally also an adjoining region of the interior space 30 of the sensor housing 24, is filled with a sealing compound 60. Here, use is preferably made of a single-component sealing compound, such as in particular a single-component foam and/or a single-component silicone sealing compound.

In a further assembly step, the printed circuit board 50 is mounted or pushed onto the contact pins 42, 43.

A printed circuit board 50 is then mounted onto the contact pins 42, 43. Subsequently, the space between the printed circuit board 50 and the installation opening 29 may likewise be filled with a sealing compound, for example a single-component foam and/or a single-component silicone sealing compound. In addition or alternatively to the sealing compound, use may also be made of a plastics cover 49, in particular in the form of a plastics foil, to cover the rear-side installation opening 29. Said plastics cover 49 may for example be welded to the sensor housing 24 by way of ultrasound. It is optionally possible for an inner side of the cover 49 or of the foil to be provided with a metal layer, composed in particular of copper, which then acts as an additional EMC shield.

The invention claimed is:

1. A method for producing an ultrasound sensor for a motor vehicle, the method comprising, for the ultrasound sensor:
    providing a diaphragm for emitting ultrasound signals in an emitting direction; and
    providing a sensor housing, in and/or on which the diaphragm is fastened, wherein by way of the sensor housing, the ultrasound sensor is installed on a holder connected to a paneling part of the motor vehicle,
    wherein the sensor housing has a front side, which points in the emitting direction of the diaphragm, and a rear side, which points in a rearward direction which is opposite to the emitting direction, and wherein, on the front side, the sensor housing is formed with a front-side opening for the diaphragm;

connecting the front side of the sensor housing to a cap which is composed of a foil and by way of which the front-side opening of the sensor housing is covered in the emitting direction;

inserting the diaphragm at least regionally into a receptacle of the cap; and connecting a front side, which points in the emitting direction, of the diaphragm to a base of the receptacle of the cap.

2. The method according to claim 1, wherein, before the connection of the cap to the sensor housing, the diaphragm is inserted into the receptacle of the cap and is connected to the base of the receptacle.

3. The method according to claim 1, wherein, firstly, the cap is connected to the front side of the sensor housing, and subsequently, the diaphragm is inserted in the emitting direction into the sensor housing through a rear-side installation opening which is formed on the rear side of the sensor housing, and said diaphragm is placed, through an interior space and the front-side opening of the sensor housing, into an installed position at the front side of the sensor housing, and said diaphragm is connected, in the installed position, to the base of the receptacle.

4. The method according to claim 1, wherein the diaphragm is received in the receptacle with an accurate fit.

5. The method according to claim 1, wherein the cap is produced from a foil with a thickness of less than 0.5 mm.

6. The method according to claim 1, wherein the cap is, on an inner side facing toward the sensor housing, formed with a coating composed of copper.

7. The method according to claim 1 wherein the front side of the diaphragm is connected to the base of the receptacle of the cap by way of an adhesive pad.

8. The method according to claim 1, wherein the cap is mounted onto the front side of the sensor housing.

9. The method according to claim 1, wherein the cap is welded to the sensor housing by way of a laser welding apparatus.

10. The method according to claim 1, wherein an intermediate space between the diaphragm and the sensor housing and/or an interior space of the diaphragm is filled with a single-component casting compound.

11. An ultrasound sensor for a motor vehicle, comprising:

a diaphragm for emitting ultrasound signals in an emitting direction; and a sensor housing, in and/or on which the diaphragm is fastened, wherein by way of the sensor housing, the ultrasound sensor is installed on a holder connected to a paneling part of the motor vehicle, wherein the sensor housing has a front side, which points in the emitting direction of the diaphragm, and a rear side, which points in a rearward direction which is opposite to the emitting direction, and wherein, on the front side, the sensor housing has a front-side opening for the diaphragm, wherein the front side of the sensor housing is connected to a cap which is composed of a foil and by way of which the front-side opening of the sensor housing is covered in the emitting direction, and wherein the diaphragm is inserted at least regionally into a receptacle of the cap and a front side, which points in the emitting direction, of the diaphragm is connected to a base of the receptacle of the cap.

12. A motor vehicle comprising an ultrasound sensor, the ultrasound sensor comprising:

a diaphragm for emitting ultrasound signals in an emitting direction; and a sensor housing, in and/or on which the diaphragm is fastened, wherein by way of the sensor housing, the ultrasound sensor is installed on a holder connected to a paneling part of the motor vehicle, wherein the sensor housing has a front side, which points in the emitting direction of the diaphragm, and a rear side, which points in a rearward direction which is opposite to the emitting direction, and wherein, on the front side, the sensor housing has a front-side opening for the diaphragm, wherein the front side of the sensor housing is connected to a cap which is composed of a foil and by way of which the front-side opening of the sensor housing is covered in the emitting direction, wherein the diaphragm is inserted at least regionally into a receptacle of the cap and a front side, which points in the emitting direction, of the diaphragm is connected to a base of the receptacle of the cap.

* * * * *